United States Patent
Nandi et al.

(10) Patent No.: US 8,044,705 B2
(45) Date of Patent: Oct. 25, 2011

(54) BOTTOM PLATE REGULATION OF CHARGE PUMPS

(75) Inventors: Prajit Nandi, Ejipura (IN); Sridhar Yadala, Ejipura (IN)

(73) Assignee: SanDisk Technologies Inc., Plano, TX (US)

( * ) Notice: Subject to any disclaimer, the term of this patent is extended or adjusted under 35 U.S.C. 154(b) by 90 days.

(21) Appl. No.: 11/845,903

(22) Filed: Aug. 28, 2007

(65) Prior Publication Data

US 2009/0058506 A1   Mar. 5, 2009

(51) Int. Cl.
*G05F 1/10* (2006.01)
(52) U.S. Cl. .................... 327/536; 327/534; 327/589
(58) Field of Classification Search .......... 327/534–537, 327/589
See application file for complete search history.

(56) References Cited

U.S. PATENT DOCUMENTS

| | | |
|---|---|---|
| 3,697,860 A | 10/1972 | Baker |
| 4,511,811 A | 4/1985 | Gupta |
| 4,583,157 A | 4/1986 | Kirsch et al. |
| 4,636,748 A | 1/1987 | Latham |
| 4,736,121 A | 4/1988 | Cini et al. |
| 4,888,738 A | 12/1989 | Wong et al. |
| 5,168,174 A | 12/1992 | Naso et al. |
| 5,175,706 A | 12/1992 | Edme |
| 5,263,000 A | 11/1993 | Van Buskirk et al. |
| 5,392,205 A | 2/1995 | Zavaleta |
| 5,436,587 A | 7/1995 | Cernea |
| 5,483,434 A | 1/1996 | Seesink |
| 5,508,971 A | 4/1996 | Cernea et al. |
| 5,521,547 A | 5/1996 | Tsukada |
| 5,563,779 A | 10/1996 | Cave et al. |
| 5,563,825 A | 10/1996 | Cernea et al. |
| 5,568,424 A | 10/1996 | Cernea et al. |
| 5,592,420 A | 1/1997 | Cernea et al. |
| 5,596,532 A | 1/1997 | Cernea et al. |
| 5,621,685 A | 4/1997 | Cernea et al. |
| 5,625,544 A | 4/1997 | Kowshik et al. |

(Continued)

FOREIGN PATENT DOCUMENTS

DE    10 2007 026290    7/2008

(Continued)

OTHER PUBLICATIONS

Feng Pan et al., "Charge Pump Circuit Design", McGraw-Hill, 2006, 26 pages.

(Continued)

*Primary Examiner* — Dinh T. Le
(74) *Attorney, Agent, or Firm* — Davis Wright Tremaine LLP

(57) ABSTRACT

Techniques of operating a charge pump are described. The charge pump is connectable to receive a clock signal and a regulating voltage and provide an output voltage. The charge pump can have one or multiple stages, each of the stages will include a capacitor. During the charging phase, the regulating voltage is used to regulate the potential of the capacitor's bottom plate. During the boosting phase, the capacitor's top plate is connected to supply the output for the stage and the bottom plate is connected to receive the stage's input. Each stage will also have a set of switching elements, allowing the capacitor to be alternately connected in the charging and boosting phases. For the first stage, the input is derived from the clock signal, and for any subsequent stages, the input will be the output of the preceding stage. The last stage provides the output voltage of the pump.

5 Claims, 4 Drawing Sheets

U.S. PATENT DOCUMENTS

| | | | |
|---|---|---|---|
| 5,693,570 | A | 12/1997 | Cernea et al. |
| 5,734,286 | A | 3/1998 | Takeyama et al. |
| 5,818,766 | A | 10/1998 | Song |
| 5,943,226 | A | 8/1999 | Kim |
| 5,945,870 | A | 8/1999 | Chu et al. |
| 5,969,565 | A | 10/1999 | Naganawa |
| 5,973,546 | A | 10/1999 | Le et al. |
| 5,982,222 | A | 11/1999 | Kyung |
| 6,008,690 | A | 12/1999 | Takeshima et al. |
| 6,018,264 | A | 1/2000 | Jin |
| 6,023,187 | A | 2/2000 | Camacho et al. |
| 6,026,002 | A | 2/2000 | Viehmann |
| 6,104,225 | A | 8/2000 | Taguchi et al. |
| 6,107,862 | A | 8/2000 | Mukainakano et al. |
| 6,134,145 | A | 10/2000 | Wong |
| 6,154,088 | A * | 11/2000 | Chevallier et al. ............ 327/536 |
| 6,188,590 | B1 | 2/2001 | Chang et al. |
| 6,198,645 | B1 | 3/2001 | Kotowski et al. |
| 6,208,198 | B1 | 3/2001 | Lee |
| 6,249,445 | B1 | 6/2001 | Sugasawa |
| 6,249,898 | B1 | 6/2001 | Koh et al. |
| 6,285,622 | B1 | 9/2001 | Haraguchi et al. |
| 6,314,025 | B1 | 11/2001 | Wong |
| 6,320,796 | B1 | 11/2001 | Voo et al. |
| 6,329,869 | B1 | 12/2001 | Matano |
| 6,344,959 | B1 * | 2/2002 | Milazzo ......................... 361/92 |
| 6,344,984 | B1 | 2/2002 | Miyazaki |
| 6,359,798 | B1 | 3/2002 | Han et al. |
| 6,370,075 | B1 | 4/2002 | Haeberli et al. |
| 6,400,202 | B1 | 6/2002 | Fifield et al. |
| 6,404,274 | B1 | 6/2002 | Hosono et al. |
| 6,424,570 | B1 | 7/2002 | Le et al. |
| 6,445,243 | B2 | 9/2002 | Myono |
| 6,456,170 | B1 | 9/2002 | Segawa et al. |
| 6,476,666 | B1 | 11/2002 | Palusa et al. |
| 6,486,728 | B2 | 11/2002 | Kleveland |
| 6,518,830 | B2 | 2/2003 | Gariboldi et al. |
| 6,525,614 | B2 | 2/2003 | Tanimoto |
| 6,525,949 | B1 | 2/2003 | Johnson et al. |
| 6,531,792 | B2 | 3/2003 | Oshio |
| 6,538,930 | B2 | 3/2003 | Ishii et al. |
| 6,545,529 | B2 | 4/2003 | Kim |
| 6,556,465 | B2 | 4/2003 | Wong et al. |
| 6,577,535 | B2 | 6/2003 | Pasternak |
| 6,606,267 | B2 | 8/2003 | Wong |
| 6,724,241 | B1 | 4/2004 | Bedarida et al. |
| 6,734,718 | B1 | 5/2004 | Pan |
| 6,760,262 | B2 | 7/2004 | Haeberli et al. |
| 6,781,440 | B2 | 8/2004 | Huang |
| 6,798,274 | B2 | 9/2004 | Tanimoto |
| 6,819,162 | B2 | 11/2004 | Pelliconi |
| 6,834,001 | B2 | 12/2004 | Myono |
| 6,859,091 | B1 | 2/2005 | Nicholson et al. |
| 6,878,981 | B2 | 4/2005 | Eshel |
| 6,891,764 | B2 | 5/2005 | Li |
| 6,894,554 | B2 | 5/2005 | Ito |
| 6,922,096 | B2 | 7/2005 | Cernea |
| 6,944,058 | B2 | 9/2005 | Wong |
| 6,975,135 | B1 | 12/2005 | Bui |
| 6,990,031 | B2 | 1/2006 | Hashimoto et al. |
| 6,995,603 | B2 | 2/2006 | Chen et al. |
| 7,002,381 | B1 | 2/2006 | Chung |
| 7,023,260 | B2 | 4/2006 | Thorp et al. |
| 7,030,683 | B2 | 4/2006 | Pan et al. |
| 7,113,023 | B2 | 9/2006 | Cernea |
| 7,116,154 | B2 | 10/2006 | Guo |
| 7,116,155 | B2 | 10/2006 | Pan |
| 7,120,051 | B2 | 10/2006 | Gorobets |
| 7,129,759 | B2 | 10/2006 | Fukami |
| 7,135,910 | B2 | 11/2006 | Cernea |
| 7,135,911 | B2 | 11/2006 | Imamiya |
| 7,208,996 | B2 | 4/2007 | Suzuki et al. |
| 7,224,591 | B2 | 5/2007 | Kaishita et al. |
| 7,227,780 | B2 | 6/2007 | Komori et al. |
| 7,239,192 | B2 | 7/2007 | Tailliet |
| 7,253,676 | B2 | 8/2007 | Fukuda et al. |
| 7,259,612 | B2 | 8/2007 | Saether |
| 7,276,960 | B2 | 10/2007 | Peschke |
| 7,345,335 | B2 | 3/2008 | Watanabe |
| 7,397,677 | B1 | 7/2008 | Collins et al. |
| 7,468,628 | B2 | 12/2008 | Im et al. |
| 7,521,978 | B2 | 4/2009 | Kim et al. |
| 7,579,903 | B2 | 8/2009 | Oku |
| 7,671,572 | B2 | 3/2010 | Chung |
| 7,772,914 | B2 | 8/2010 | Jung |
| 2002/0014908 | A1 | 2/2002 | Lauterbach |
| 2002/0075706 | A1 | 6/2002 | Foss et al. |
| 2002/0140463 | A1 | 10/2002 | Cheung |
| 2003/0128560 | A1 | 7/2003 | Saiki et al. |
| 2003/0214346 | A1 | 11/2003 | Pelliconi |
| 2005/0093614 | A1 | 5/2005 | Lee |
| 2005/0195017 | A1 | 9/2005 | Chen et al. |
| 2005/0237103 | A1 | 10/2005 | Cernea |
| 2005/0248386 | A1 | 11/2005 | Pan et al. |
| 2006/0114053 | A1 | 6/2006 | Sohara et al. |
| 2006/0244518 | A1 | 11/2006 | Byeon et al. |
| 2007/0001745 | A1 | 1/2007 | Yen |
| 2007/0069805 | A1 | 3/2007 | Choi et al. |
| 2007/0126494 | A1 | 6/2007 | Pan |
| 2007/0139099 | A1 | 6/2007 | Pan |
| 2007/0139100 | A1 | 6/2007 | Pan |
| 2007/0222498 | A1 | 9/2007 | Choy et al. |
| 2007/0229149 | A1 | 10/2007 | Pan et al. |
| 2008/0024096 | A1 | 1/2008 | Pan |
| 2008/0111604 | A1 | 5/2008 | Boerstler et al. |
| 2008/0116963 | A1 | 5/2008 | Jung |
| 2008/0157852 | A1 | 7/2008 | Pan |
| 2008/0157859 | A1 | 7/2008 | Pan |
| 2008/0218134 | A1 | 9/2008 | Kawakami |
| 2008/0239802 | A1 | 10/2008 | Thorpe |
| 2008/0239856 | A1 | 10/2008 | Thorpe |
| 2008/0278222 | A1 | 11/2008 | Conte et al. |
| 2009/0033306 | A1 | 2/2009 | Tanzawa |
| 2009/0051413 | A1 | 2/2009 | Chu et al. |
| 2009/0091366 | A1 | 4/2009 | Baek et al. |
| 2009/0121780 | A1 | 5/2009 | Chen et al. |
| 2009/0167418 | A1 | 7/2009 | Raghavan |
| 2009/0219077 | A1 | 9/2009 | Pietri et al. |
| 2010/0244935 | A1 | 9/2010 | Kim et al. |

FOREIGN PATENT DOCUMENTS

| | | |
|---|---|---|
| EP | 0 382 929 A | 8/1990 |
| EP | 0 780 515 A | 6/1997 |
| WO | WO 01/06336 A1 | 1/2001 |
| WO | WO 2006/132757 | 12/2006 |

OTHER PUBLICATIONS

Louie Pylarinos et al., "Charge Pumps: An Overview", Department of Electrical and Computer Engineering University of Toronto, 7 pages.

Office Action for U.S. Appl. No. 11/845,939 mailed Nov. 5, 2008, 15 pages.

Ang et al., "An On-Chip Voltage Regulator Using Switched Decoupling Capacitors," 2000 IEEE International Solid-State Circuits Conference, 2 pages.

* cited by examiner

BOTTOM PLATE REGULATION OF CHARGE PUMPS

CROSS-REFERENCE TO RELATED APPLICATIONS

This application is related to U.S. application Ser. No. 11/845,939, of Prajit Nandi and Sridhar Yadala, entitled "Bottom Plate Regulated Charge Pump," which is filed concurrently with the present application.

FIELD OF THE INVENTION

This invention pertains generally to the field of charge pumps and more particularly to a charge pump using a bottom plate regulation scheme.

BACKGROUND

Charge pumps use a switching process to provide a DC output voltage larger than its DC input voltage. In general, a charge pump will have a capacitor coupled to switches between an input and an output. During one clock half cycle, the charging half cycle, the capacitor couples in parallel to the input so as to charge up to the input voltage. During a second clock cycle, the transfer half cycle, the charged capacitor couples in series with the input voltage so as to provide an output voltage twice the level of the input voltage. This process is illustrated in FIGS. 1a and 1b. In FIG. 1a, the capacitor 5 is arranged in parallel with the input voltage $V_{IN}$ to illustrate the charging half cycle. In FIG. 1b, the charged capacitor 5 is arranged in series with the input voltage to illustrate the transfer half cycle. As seen in FIG. 1b, the positive terminal of the charged capacitor 5 will thus be $2*V_{IN}$ with respect to ground.

Typical charge pump designs, such as conventional Dickson-type pumps, are suited for supplying capacitive loads; however, the efficiency of such pumps drops dramatically when it is required to supply a DC current Load. One common charge pump application is as peripheral circuitry on flash memories for operations where there are such requirements from pumps. Accordingly, there is a need in the art for charge pumps that achieve higher efficiency when supplying DC loads.

SUMMARY OF THE INVENTION

Techniques of operating a charge pump are described. The charge pump is connectable to receive a clock signal and a regulating voltage and provide an output voltage. The charge pump can have one or multiple stages, each of the stages will include a capacitor having first (or "top") and second (or "bottom") plates. During a first (or "charging") phase, the regulating voltage is used to regulate the potential of the bottom plate. During a second (or "boosting") phase, the top plate is connected to supply the output for the stage and the bottom plate is connected to receive the stage's input. Each stage will also have a set of switching elements, allowing the capacitor to be alternately connected in the first and second phases. For the first stage, the input is derived from the clock signal, and for any subsequent stages, the input will be the output of the preceding stage. The last stage provides the output voltage of the pump.

Various aspects, advantages, features and embodiments of the present invention are included in the following description of exemplary examples thereof, which description should be taken in conjunction with the accompanying drawings. All patents, patent applications, articles, other publications, documents and things referenced herein are hereby incorporated herein by this reference in their entirety for all purposes. To the extent of any inconsistency or conflict in the definition or use of terms between any of the incorporated publications, documents or things and the present application, those of the present application shall prevail.

BRIEF DESCRIPTION OF THE DRAWINGS

The various aspects and features of the present invention may be better understood by examining the following figures, in which.

DETAILED DESCRIPTION

As noted in the Background section, many conventional charge pumps, such as those of the Dickerson type, are suited for supplying capacitive loads, but the efficiency of such pumps drops when they are required to supply a DC current load. Charge pumps are often in as peripheral devices in applications having such requirements, as in flash memories. The arrangement presented here uses a scheme that can achieve much higher efficiency when supplying DC loads than prior art techniques, such as the normal Vt Cancellation techniques are used to improve the efficiency. In particular, the following discussion describes a pump scheme that focuses on a bottom plate regulation scheme that provides higher efficiency and less ripple when compared to existing schemes.

The improvements described can be incorporated into various charge pump designs, both of the Dickson type mentioned in the Background section as well as more general designs.

More information on Dickenson type pumps, and charge pumps generally, can be found, for example, in "Charge Pump Circuit Design" by Pan and Samaddar, McGraw-Hill, 2006, or "Charge Pumps: An Overview", Pylarinos and Rogers, Department of Electrical and Computer Engineering University of Toronto, available at on the webpage "www.eecg.toronto.edu/~kphang/ece1371/chargepumps.pdf". Further information on various other charge pump aspects and designs can be found in U.S. Pat. Nos. 5,436,587; 6,370,075; 6,922,096; and 7,135,910; and applications Ser. No. 10/842,910 filed on May 10, 2004; Ser. No. 11/295,906 filed on Dec. 6, 2005; Ser. No. 11/303,387 filed on Dec. 16, 2005; Ser. No. 11/497,465 filed on Jul. 31, 2006; and Ser. No. 11/523,875 filed on Sep. 19, 2006.

Figure 1A:
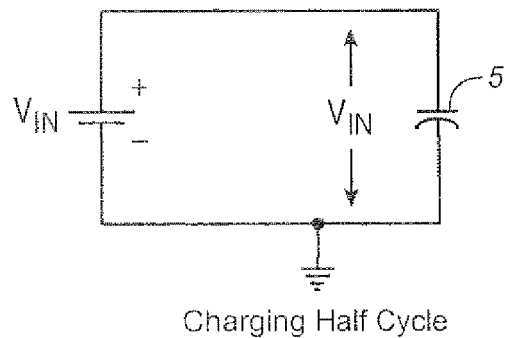
FIG. 1a is a simplified circuit diagram of the charging half cycle in a generic charge pump.
Figure 1B:
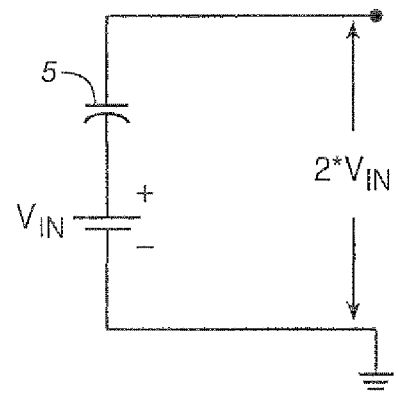
FIG. 1b is a simplified circuit diagram of the transfer half cycle in a generic charge pump.
Figure 2:
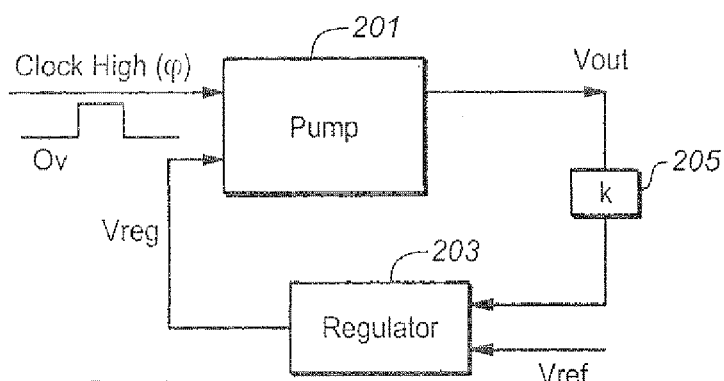
FIG. 2 is a top-level block diagram for a regulated charge pump.

FIG. 2 is a top-level block diagram of a typical charge pump arrangement. Although such an arrangement can be found in the prior art as well as used for the improvements presented here, a basic difference between these is in how the regulated voltage (Vreg) is used within the pump block. As shown in Figure 201, the charge pump 201 has as inputs a clock signal and a voltage Vreg and provides an output Vout. The voltage Vreg is provided by the regulator 201, which has as inputs a reference voltage Vref and the output of block 205. The regulator block 203 regulates the value of Vreg such that $k*V_{out}=V_{ref}$, where, by adjusting the value of k, the desired value of Vout can be obtained. Block 205 receives as input Vout and adjusts k accordingly. K can be implemented as, for example, a resistor ratio and is typically adjusted through a digital to analog converter, as will be familiar in the art. (Although not shown, the regulator (203) will also be connected to receive the voltage Vext from the external power supply to the chip.)

Vref is a fixed reference value, such as provided by bandgap generator (not shown) with a voltage of, say, 1.2 volts. Clock_High is a clock (not shown) input to the Pump 201. The "1" voltage level of Clock_High ($\phi$) should preferably be high enough to minimize the drop across the switches used for charge transfer.

Figure 3:
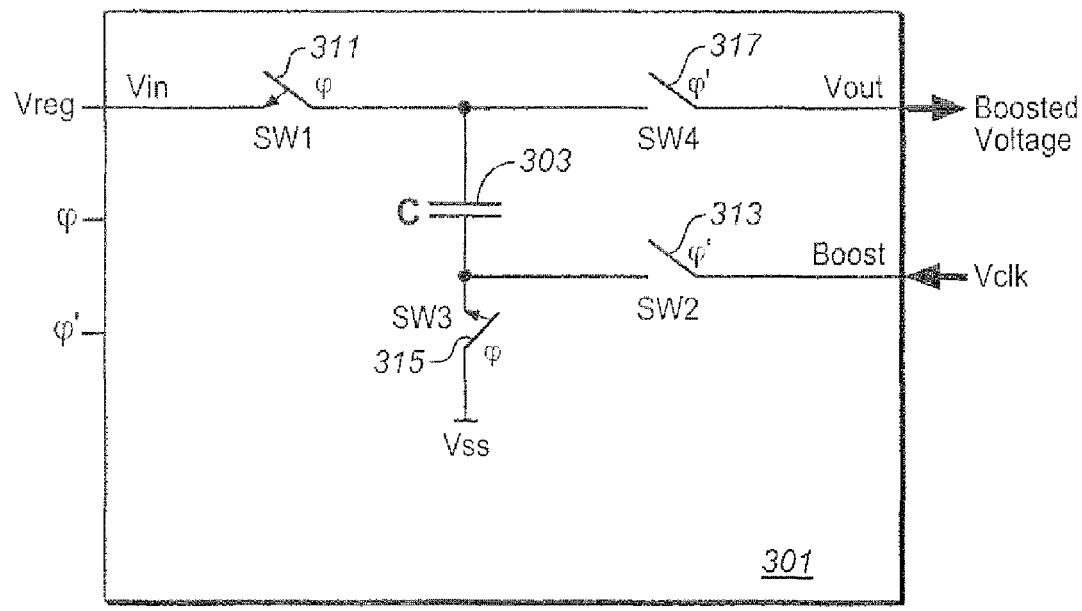
FIGS. 3 and 4 are a simplified circuit diagram of a charge pump using a conventional (top plate) regulation scheme respectively illustrating the charging and boosting phase.
Figure 4:
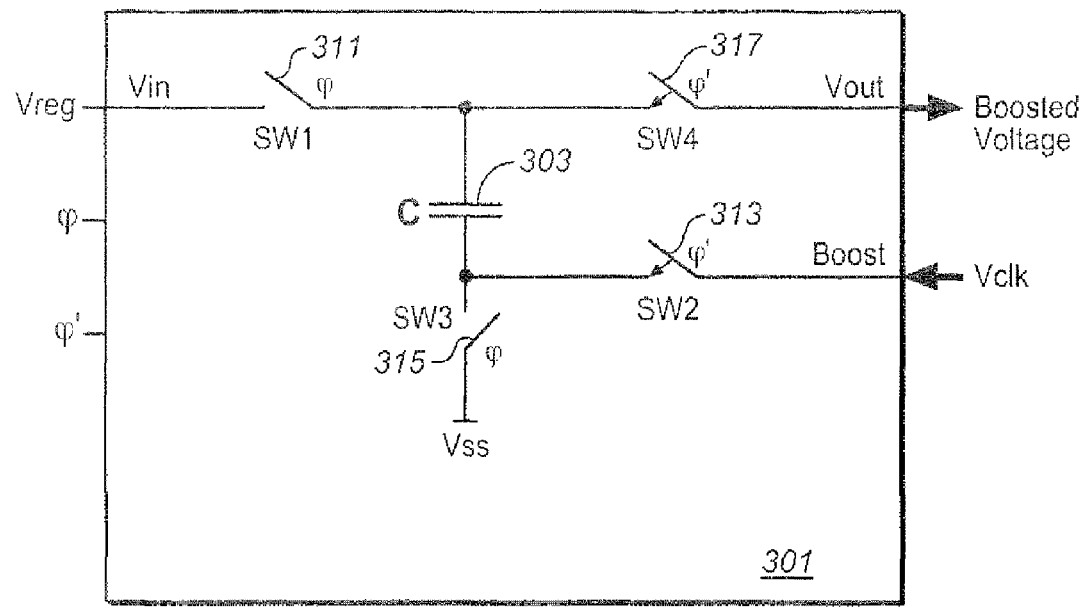

To provide context for the various aspects described here, some further discussion of the prior art is first given with respect to FIGS. 3 and 4. These each show a stage 301 in charge pump to illustrate how various voltages are applied to the plates of stages capacitor element in the charging phase (FIG. 3) and in the boosting phase (FIG. 4). The various voltages are applied to the top and bottom plates of capacitor C 303 by switches SW1 311, SW2 313, SW3 315, and SW 317. The top plate of C 303 is connectable to an input voltage Vin through SW1 311 and to supply an output voltage Vout SW4 317. The bottom plate of capacitor C 303 is connectable to the "Boost" input through SW2 313 and to the circuit's low voltage value (Vss) through SW3 315. (As used here, "top plate" and "bottom plate" do not necessarily refer to the actual position of these plates in the circuit's physical arrangement, but rather represent the standard terminology, where the "top plate" is the one that supplies the output voltage of a given stage.)

The stage 301 receives the level to be boosted is input at the Boost input. This typically will be the high clock level Vclk for the first stage and the output of the preceding stage for subsequent stages. Vout is the boosted voltage output from the stage, which is then input to the subsequent stage or, for the last stage, the output of the pump. Under the typical prior art arrangement, the voltage level Vreg from the regulator 203 (FIG. 2) is supplied at Vin.

The pump stage 301 also receives the clock signal ($\phi$), its inverse ($\phi'$), or both, which are supplied to control the switches SW1 311, SW2 313, SW3 315, and SW 317 to control these various connections, with SW1 311 and SW3 315 being closed when the clock signal is high (corresponding to the charging phase) and SW2 313 and SW4 317 being closed when the clock signal is low (boosting phase) in the arrangement of FIGS. 3 and 4.

FIG. 3 shows the charging phase in the conventional pump arrangement, where the top plate is regulated. In the charging phase, SW2 313 and SW4 317 are open, isolating the capacitor C 303 from the stage's input (Vclk or the preceding stages output) and output. As shown in the figure, switches SW1 311 and SW3 315 are closed, connecting the lower plate to the low level Vss and the top plate to Vin, which is Vreg in this arrangement. This allows the capacitor C 303 in the unit cell 301 to be charged up from the regulated voltage Vreg from the regulator (203, FIG. 2).

Under the arrangement of FIG. 3, the regulated voltage, Vreg, is supplied to the top plate during the charging phase. Consequently, it determines the amount of charge injected into the capacitor C 303.

FIG. 4 illustrates the boosting phase, during which the switch SW4 317 is ON and the capacitor C 303 supplies power to the load. Switches SW1 311 and SW3 315 are OFF. Switch SW2 313 is ON so that the node "Boost" is connected to the output of the previous stage or a Clock driver (Vclk), as applicable in different pump architectures. If the unit cell 301 is the last stage of the pump, the node Vout is connected to the output load in alternate cycles of $\phi$.

Figure 5:
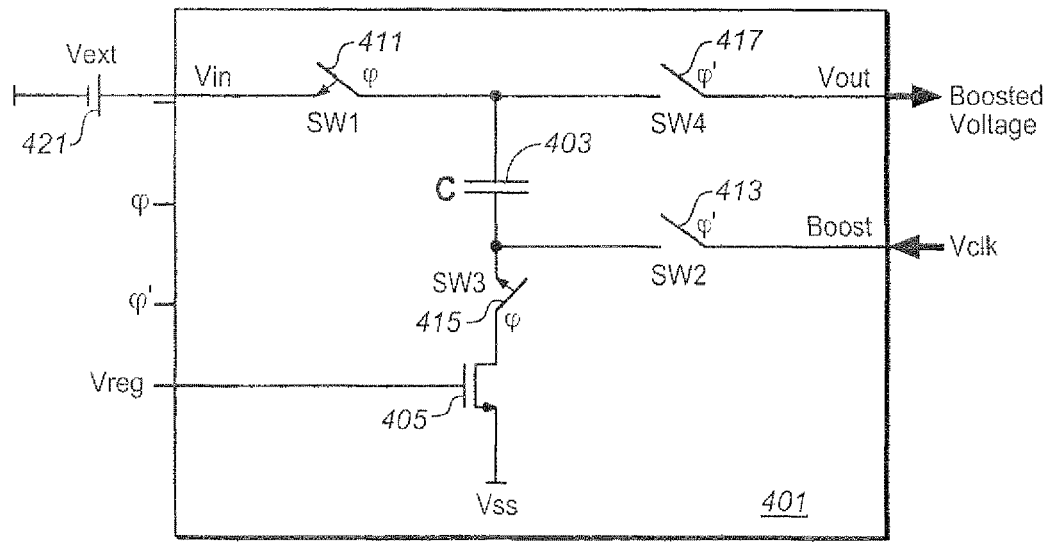
FIGS. 5 and 6 are a simplified circuit diagram of a charge pump illustrating a bottom plate regulation scheme during the charging and boosting phase, respectively.
Figure 6:
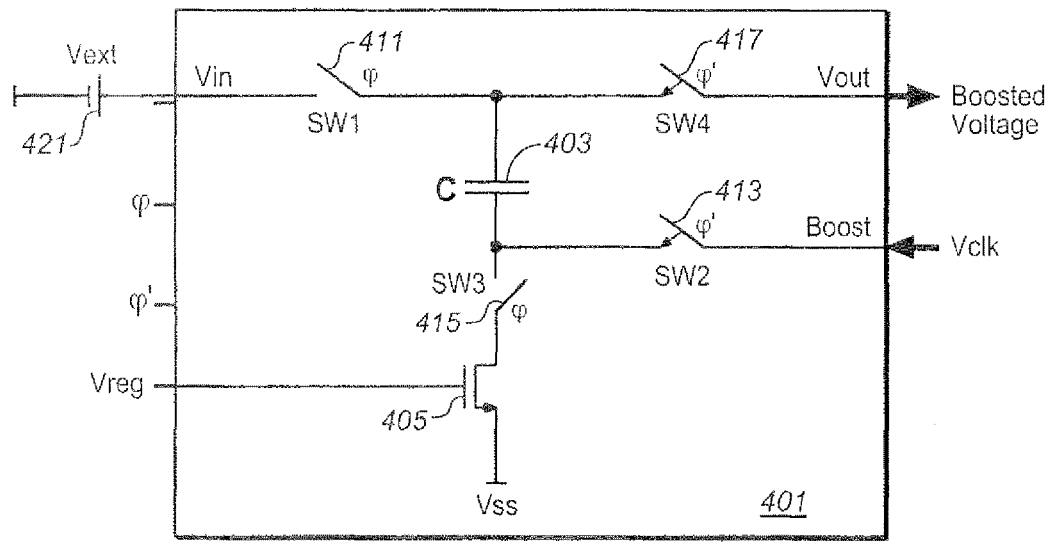

FIGS. 5 and 6 are, in the bottom plate regulated architecture presented here, the respective counterparts of (the top plate regulated) FIGS. 3 and 4 and are similarly simplified for the purposes of this discussion. In the arrangement of FIGS. 5 and 6, the unit cell again contains a capacitor C 403 and switches SW1 411, SW2 413, SW3 415, and SW4 417, which are controlled as before. SW2 413 and SW4 417 are again respectively connected to receive Vclk at the Boost node at the lower plate and provide the Boosted voltage to the Vout node. SW1 411 again connects the top plate to the Vin node, but, in contrast to the usual arrangement, an external voltage source 421 supplies Vext, rather than the regulated voltage Vreg. The external power supply, such as would be provided by the user, would typically be in the range of from 2.5V to 3.8V in present technologies, although the trend is always to lower power levels. Further, in contrast to the standard prior art arrangements, although switch SW3 415 still connects the lower plate to the Vss level, the regulated voltage level Vreg now controls this connection.

FIG. 5 shows the charging phase, when switches SW1 411 and SW3 415 are ON, and SW2 413 and SW4 417 are open. As SW1 411 is closed, in the charging phase the capacitor C 403 in the unit cell gets charged up from the external power supply Vext. This will be a value higher than the Vreg value supplied at the Vin node in the top plate regulated scheme of FIG. 3. Instead, the regulated voltage Vreg now determines the impedance between the bottom plate of C 403 and Vss and thus, regulates the amount of charge flowing into the capacitor C 403 during the time SW1 411 and SW3 415 remain ON. In the exemplary embodiment, this is done by applying Vreg to the control gate of a transistor 405.

FIG. 6 illustrates the boosting phase, during which the switch SW4 417 is ON and the capacitor C 403 supplies power to the load. As in FIG. 4, switches SW1 411 and SW3 415 are OFF, and switch SW2 413 is ON so that the node "Boost" is connected to the output of the previous stage or a Clock driver (Vclk), as applicable in different pump architectures. If the unit cell 401 is the last stage of the pump, the node Vout is connected to the output load in alternate cycles of $\phi$. Although the boosting phase is much the same for both of FIGS. 4 and 6, the voltage levels on the plates of capacitor C will have been set to different levels due to the differences between the charging phases in FIGS. 3 and 5.

Figure 7:
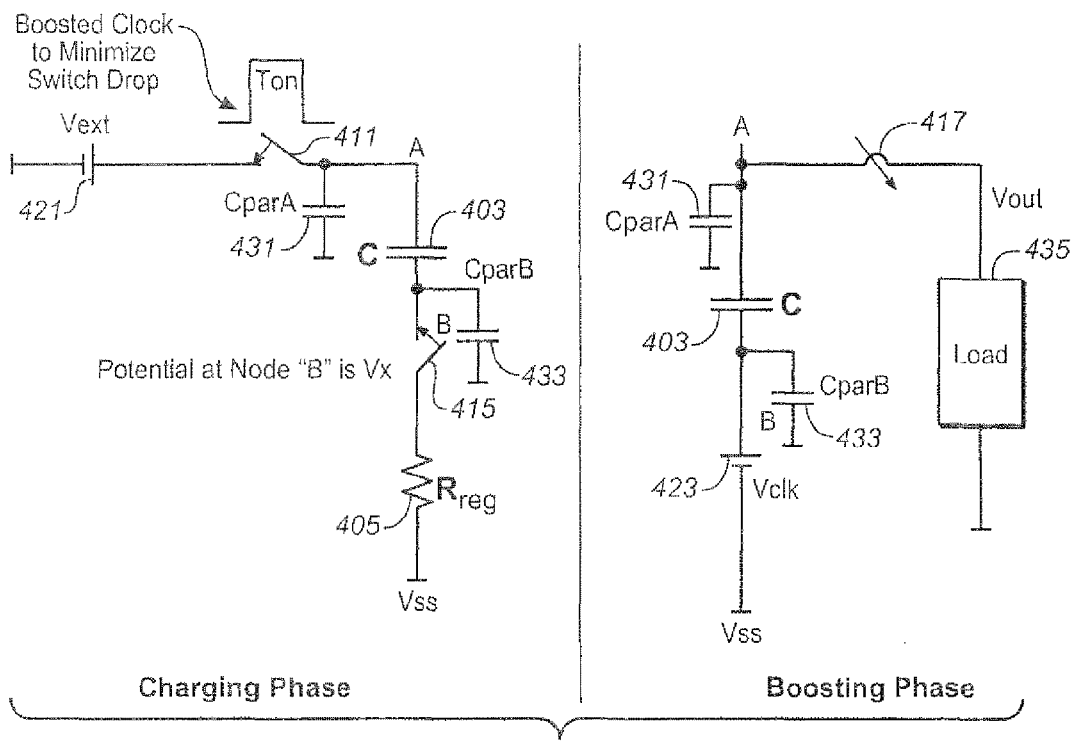
FIGS. 7 and 8 are used to illustrate the steady state oscillations according to aspects of the present invention and according to a conventionally scheme, respectively.
Figure 8:
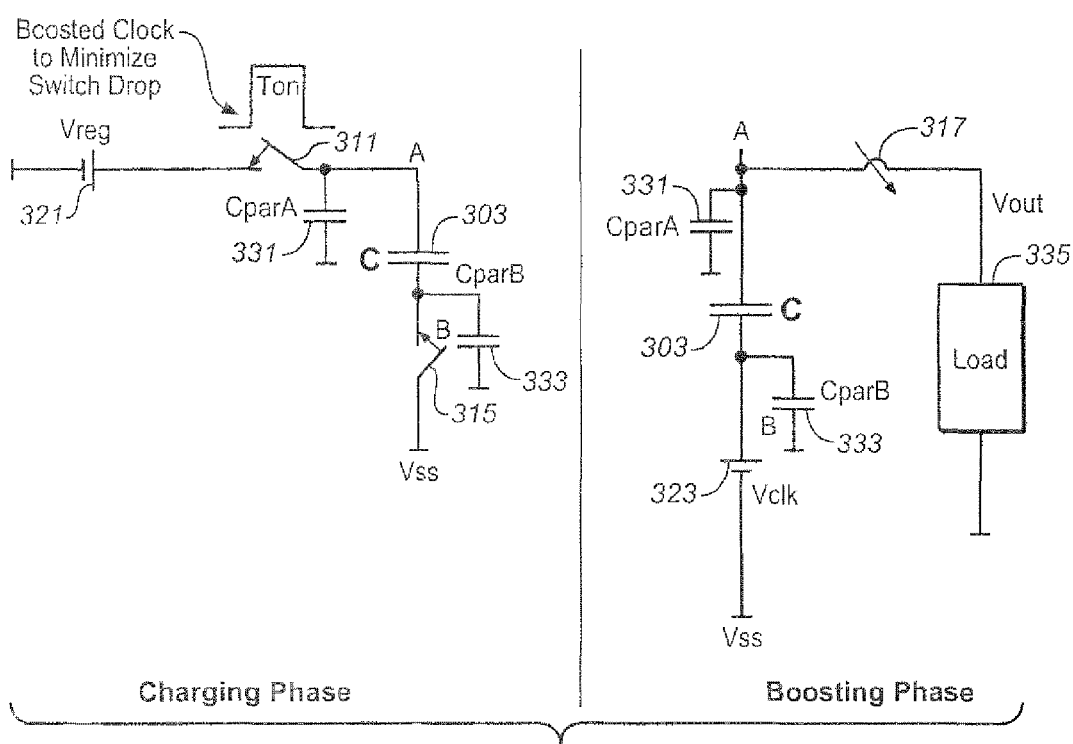

FIGS. 7 and 8 can be used to further illustrate the differences between the bottom plate regulated scheme presented here and the usual top plate regulation found in the prior art. In both figures, only a single stage is shown to simply the discussion of steady state oscillation given here, although it will again be understood that this may just be one of multiple stages.

FIG. 7 corresponds to FIGS. 5 (charging phase, on the left) and FIG. 6 (boosting phase, on the right), with the open switches and their corresponding connections left out in each case. Nodes A and B respectively correspond to the levels at the top and bottom plates of the capacitor C 403. The corresponding parasitic capacitances are shown as CparA 431 and CparB 433.

In the charging phase, node A is connected through closed switch 411 to the external voltage source 421. Node B is connected though closed switch 415 to Vss, with the resistance Rreg 405 interposed in between. The resistance value Rreg is controller by the regulator voltage Vreg, with the transistor 405 of FIG. 5 being one simple implementation. The switch 411 (SW1 in FIGS. 5 and 6) is preferably turned on for a time Ton by a boosted clock signal to minimize switch drop by, for example, offsetting the threshold voltage of the pass transistor used to implement the switch. The potential at node B in this phase will be called Vx for reference.

In the boosting phase on the right of FIG. 7, the lower plate is schematically connected (in this single stage pump example) to clock level voltage source 423 to receive Vclk. Node A is connected though switch 417 (SW4 in FIG. 6) to drive the load 435.

FIG. 8 is the conventional, top-plate regulated counterpart of FIG. 7 and corresponds to FIG. 3 (charging phase, on the left) and FIG. 4 (boosting phase, on the right), with the open switches and their corresponding connections again left out in each case. The charging phase of FIG. 8 differs from that of FIG. 7 in that node A is now connected through the switch to the regulator voltage source 321 to receive Vreg instead of Vext and the regulator resistance Rreg is absent. The boosting phases can be, aside from the relabeling, the same.

Referring back to FIG. 7, in the bottom plate regulated architecture presented here, the power loss due to the parasitic capacitances CparA 431 at node A (the top plate of C 403) and CparB 433 at node B (the bottom plate of C 403) is given by:

$$P_{loss1}(\text{power loss in parasitics}) = [CparA*(Vout-Vext)^2 + CparB*(Vclk-Vx)^2]*f, \quad (1)$$

In the conventional architecture of FIG. 8, the power loss due to CparA 331 and CparB 333 is:

$$P_{loss2}(\text{power loss in parasitics}) = [CparA*(Vout-Vreg)^2 + CparB*(Vclk)^2]*f, \quad (2)$$

where in both of equations (1) and (2), f is the frequency of pump operation. As Vext is the external power supply level, it will generally be the highest available supply voltage and Vreg will be derived from it, so that:

$$Vreg < Vext. \quad (3)$$

Additionally, for the potential at node B, Vx, $$Vx > 0. \quad (4)$$

Applying equations 3 and 4 in equations 1 and 2, it follows that:

Ploss1<Ploss2.

Hence, the proposed pump is more efficient than conventional pumps having top plate regulation scheme. Although derived for just a single stage to simply the discussion, this can similarly be shown to be true for pumps having more than one stage.

Referring again to the charging phase of FIG. 7, by regulating the value Rreg 405, the charging time constant of the circuit is regulated and the amount of charge flowing into the capacitor C 403 during the time Ton is controlled. The top plate (node A) is charged up to the highest voltage provided by the user Vext, while the bottom plate (node B) does not always go to Vss. (If Rreg is 0, then node B goes to Vss.) This arrangement allows the amount of steady state oscillation seen at node A and node B to be minimized, as the amount of oscillation seen at node A between the charging phase and the boosting phase is (Vout-Vext), which approaches the minimum achievable, and the amount of oscillation seen at node B between the charging phase and the boosting phase is (Vclk-Vx), which again approaches the minimum achievable.

As described, the suggested architecture has a number of difference from, and improvements over, the prior art. Rather than using the regulator voltage Vreg for the top plate, the highest available voltage given by the user, Vext, is used for the top plate and a boosted clock is preferably used to minimize switch resistance and effect the realization of charging the top plates of the capacitors to Vext. The bottom plate of the capacitor elements is regulated to a value higher than VSS, going only to VSS when the pump is ramping-up or recovering. In this way, the steady state oscillations seen at the capacitor nodes are minimized; thus, charge loss in the parasitic at these nodes is minimized and higher efficiency is obtained (e.g., 50% more efficient than typical existing schemes).

By increasing efficiency in this way, the "$I^2R$" power losses in the regulator, switches, and interconnect parasitic resistances are also minimized. This allows for the pump to be designed in lesser area. Further, the use of continuous regulation in the charging phase, and not in the boosting phase, reduces the pump impedance and makes it stronger. Additionally, as discussed, the use of bottom plate based regulation results in low ripple and better ramp-up and recovery times. The bottom plate regulation scheme described can be applied to any of the various pump architectures, such as those given in the various references cited above.

Although the invention has been described with reference to particular embodiments, the description is only an example of the invention's application and should not be taken as a limitation. Consequently, various adaptations and combinations of features of the embodiments disclosed are within the scope of the invention as encompassed by the following claims.

It is claimed:

1. In a charge pump circuit having one or more stages each having an input and an output, a method of generating an output voltage for the charge pump circuit, comprising:
   receiving as the input of a first of said stages an input signal based on a clock signal;
   receiving as the input of each stage after the first the output of the preceding stage; and
   supplying the output of the last of said stages as the output voltage of the charge pump circuit,
   wherein each of the stages includes a capacitor element having first and second plates and the method further comprises:
   alternately operating each of the stages in a first phase and a second phase, the first phase including:
   regulating of a charge level on the second plate by a regulating voltage; and
   connecting the first plate to an external voltage supply, wherein the connecting the first plate to the external voltage supply comprises connecting the first plate to the external voltage supply by a switch controlled by a boosted version of the clock signal; and
   the second phase including:
   connecting the first plate to supply the stage's output; and
   connecting the second plate to receive the stage's input.

2. The method of claim 1 the first phase further comprising:
   connecting the first plate to an external voltage supply.

3. The method of claim 1, wherein said regulating of the charge level on the second plate by the regulating voltage includes connecting the second plate to a low voltage level of an integrated circuit upon which the charge pump circuit is formed through a resistance controlled by the regulating voltage.

4. The method of claim 3, wherein the resistance controlled by the regulating voltage includes a transistor having a gate connected to the regulating voltage.

5. The method of claim 1, wherein the charge pump circuit is formed as peripheral circuitry on a memory circuit including an array of memory cells, the method further comprising:
   providing the output voltage of the charge pump as an operation voltage for use in the memory array.

* * * * *